(12) United States Patent
Peterson

(10) Patent No.: US 10,489,869 B2
(45) Date of Patent: Nov. 26, 2019

(54) ORGANICS HEALTHY DRIVE THROUGH

(71) Applicant: Susan L Peterson, St. Charles, IL (US)

(72) Inventor: Susan L Peterson, St. Charles, IL (US)

( * ) Notice: Subject to any disclaimer, the term of this patent is extended or adjusted under 35 U.S.C. 154(b) by 362 days.

(21) Appl. No.: 15/215,249

(22) Filed: Jul. 20, 2016

(65) Prior Publication Data

US 2017/0024834 A1    Jan. 26, 2017

Related U.S. Application Data

(60) Provisional application No. 62/196,498, filed on Jul. 24, 2015.

(51) Int. Cl.
| | | |
|---|---|---|
| *G06Q 50/12* | (2012.01) | |
| *G06Q 30/06* | (2012.01) | |
| *G06Q 20/20* | (2012.01) | |

(52) U.S. Cl.
CPC .......... *G06Q 50/12* (2013.01); *G06Q 20/203* (2013.01); *G06Q 30/0641* (2013.01)

(58) Field of Classification Search
CPC .. G06Q 50/12; G06Q 20/203; G06Q 30/0641; G06Q 20/20
USPC ........ 705/15, 332, 339; 340/286.09; 186/36, 186/38
See application file for complete search history.

(56) References Cited

U.S. PATENT DOCUMENTS

| | | | | |
|---|---|---|---|---|
| 4,675,515 | A  * | 6/1987 | Lucero ................. | G06Q 20/342 186/41 |
| 7,680,690 | B1 * | 3/2010 | Catalano ................ | G06Q 30/02 186/38 |
| 2002/0016747 | A1 * | 2/2002 | Razumov ............. | G06Q 20/203 705/26.8 |
| 2002/0147647 | A1 * | 10/2002 | Ragsdale-Elliott .... | G06Q 20/20 705/15 |
| 2003/0195821 | A1 * | 10/2003 | Kennamer ........... | G06Q 10/087 705/26.1 |
| 2006/0006025 | A1 * | 1/2006 | Dev ........................ | A47F 10/06 186/36 |
| 2008/0097861 | A1 * | 4/2008 | Awiszus ............... | G06Q 10/087 705/15 |
| 2008/0208718 | A1 * | 8/2008 | Hanson .................. | G06Q 30/06 705/27.1 |
| 2008/0222004 | A1 * | 9/2008 | Pollock .............. | G06Q 30/0603 705/15 |
| 2008/0262934 | A1 * | 10/2008 | Klementowicz ....... | G06Q 30/06 705/15 |
| 2012/0190386 | A1 * | 7/2012 | Anderson ............. | G01C 15/04 455/456.3 |

* cited by examiner

*Primary Examiner* — Vanel Frenel
(74) *Attorney, Agent, or Firm* — Charles F. Meroni, Jr.; Meroni & Meroni, PC

(57) ABSTRACT

An improved drive through and organics foods store and associated systems and methods are provided. The present invention makes several improvements to the organics food industry by implementing novel methods to streamline the sale of organic foods to customers, including novel supplying, ordering, and distribution models for organic and non-GMO foods.

19 Claims, 4 Drawing Sheets

ORGANICS HEALTHY DRIVE THROUGH

BACKGROUND OF THE INVENTION

Field of the Invention

The present invention generally relates to an improved drive through and organics foods store. In particular the present invention makes several improvements to the organics food industry by implementing novel methods to streamline the sale of organic foods to customers. Typically, organic food stores utilize a buffet-style distribution and sale model, the system and design of the current invention allows users to short-circuit that process and receive similar food from a fast-food style drive through.

Discussion of the Prior Art

U.S. Pat. No. 6,435,406 ('406 patent), which issued to Pentel, discloses a Remote Ordering Device. The '406 patent describes a cell phone or other wireless telecommunications device is used to communicate with an ordering station over a cellular telephone communications network and telephone line. A coded item number can be entered and transmitted to the ordering station, which decodes the coded item number and enters the order into the point of sale system by a communications link. Further, data such as the identity of the user by physical characteristics, personal identification numbers, credit card or charge information, and location of the sender of the data can also be obtained from the wireless communications device and transmitted to the order station. In this manner remote ordering of goods or services can be communicated and transactions completed without having to be present at the sales point.

U.S. Pat. No. 7,895,797 ('797 patent), which issued to Bridgman et al., describes a Drive-Thru System and Method. The '797 patent describes a vehicular drive-thru food ordering and delivering system and method. The system includes a lot, a drive-thru lane and a building for receiving and filling drive-thru orders. The building has a primary food delivery window for passing ready orders to drive-thru customers, and a downstream in-line parking area for drive-thru vehicles having a delayed order. Proximate to and downstream from the primary food delivery window is a doorway for attendant access from the primary food delivery window to the downstream in-line parking area. An attendant runway is proximate and downstream of the doorway and proximate to the in-line vehicle waiting area. A customer with a delayed order can be directed to wait in the downstream in-line waiting area. When the delayed order is ready for delivery, an attendant can deliver the ready order via the proximate doorway and proximate attendant runway to a vehicle waiting in the in-line vehicle waiting area.

U.S. Pat. No. 7,992,355 ('355 patent), which issued to Bridgman et al., describes a Drive-Thru System and Method. The '33 patent describes a vehicular drive-thru food ordering and delivering system and method. The system includes a lot, a drive-thru lane and a building for receiving and filling drive-thru orders. The building has a primary food delivery window for passing ready orders to drive-thru customers, and a downstream in-line parking area for drive-thru vehicles having a delayed order. Proximate to and downstream from the primary food delivery window is a doorway for attendant access from the primary food delivery window to the downstream in-line parking area. An attendant runway is proximate and downstream of the doorway and proximate to the in-line vehicle waiting area. A customer with a delayed order can be directed to wait in the downstream in-line waiting area. When the delayed order is ready for delivery, an attendant can deliver the ready order via the proximate doorway and proximate attendant runway to a vehicle waiting in the in-line vehicle waiting area.

U.S. Patent Application, Publication No. 2004/0143503, which was authored by Suthar, describes a restaurant automation system with greater efficiencies for the restaurant owner and greater ease for the diner through the use of wireless electronic menus with which the individual diner can communicate an order to the central server which communicates to a kitchen display, and receives a message when order preparation has begun; the central server being also in communication with a payment station, which generates a bill at the direction of the diner.

SUMMARY OF THE INVENTION

A difficulty for organic food stores is simple distribution of their products to the consumer. While they are capable of competing with standard supermarkets for a share of the grocery store and big box economy, fast food and organic quick food establishments such as Chipotle Mexican Grill, Inc. offer organic food that is quick and easy for the user consumer to buy. Even traditional chains and burger joints are now offering more organic options. Some organic food stores now offer hot food options, however those methods are generally inefficient, nor do they solve the underlying problem competing with chain food and locally grown food offerings.

Thus, the current system and methods have several unique features that result in a more efficient process for selling non-GMO (genetically modified organism) and organic foodstuffs. Firstly, the system can utilizes a second building or kiosk located in front of an organic food store that serves as a fast-serve drive through restaurant. Secondly, it provides a simple and efficient calorie counter and menu for customers at the drive through in a traditional drive-thru environment. Mobile applications also replicate the menu in such a way that simplifies ordering and allows for "take out" ordering. The system also allows for the resupplying of the drive through from the organic and non-GMO foods store to reduce kitchen space and allow for a quicker and more efficient system for the store and store-ecosystem as a whole.

Therefore, the present patent application is a win:win scenario for retailers and consumers.

The patent application represents a win process for retailers because it allows retailers to sell organic (specialty food) in a quick convenient manner. This creates more marketing and branding for the retailer and its specialty products. This allows the retailer to capitalize now on groceries, gas (in some cases), and now fast food. This would generate more sales for the retailers with this drive through model. This allows the retailer to sell more expensive products and turnover its inventory on faster basis. By attracting customers that didn't have time to go into store it is allowing the retailer more opportunity to create a stream of residual income. Studies have proven when a retailer samples or sells a small quantity of the product it helps increase overall sales and traffic for the retailer.

Additionally, this is a win for consumers. This allows consumers to try or sample specialty food in a small quantity. This way they can see if there is a value for consumers to purchase the same goods (meals) inside grocery store in a larger quantity. The cost of organic and specialty food can sometimes be up to twice as costly as regular groceries, thus consumers can sample on a smaller basis. This model is also very convenient for customers. This way customers can purchase gas, groceries, and fast food all at the same time. A one stop shop. The two things most consumers' value most are price and convenience. The demand for organic food has dramatically increased by consumers but there are currently no retailers selling small quantities of organic fast food in same parking lot of grocery store.

To achieve these objectives, an organics healthy drive through having the following features is proposed.

In a first embodiment a method for providing and selling organic food having at least the steps of providing an organic food retail store, providing a drive through restaurant adjacent said organic food retail store, receiving orders from a customer, assembling a customer's organic food order based on the orders from the customer, checking out the customer, and providing the customer's organic food order to the customer. Additional steps and details may preferably include: preparing organic food at the organic food retail store; transporting said organic food to the drive through restaurant; utilizing said organic food when assembly the customer's food order; preparing organic food at the organic food retail store includes cooking the organic food order; preparing organic food at the organic food retail store does not include cooking the organic food order; utilizing said organic food when assembly the customer's food order at the drive through restaurant includes cooking said organic food; receiving orders from a customer comprises receiving orders from an internet application; providing the customer's organic food order to the customer is done at a pick up-only entrance; receiving orders from a customer comprises receiving orders from a menu located adjacent the drive through restaurant; and providing the customer's organic food order to the customer is done a drive through pickup window.

Another preferred embodiment of the present invention contemplates a drive through organic food restaurant system for providing both vehicular drive-thru and non-drive-thru customer food ordering, the drive-thru having: a parking lot, a first building situated on the lot, being an organic foods restaurant for preparing drive-thru and non-drive-thru customer orders and for delivering of the customer orders to the customers, a second building situated on the lot, being an organic foods grocery store, a vehicular pathway for customers, the pathway including at least one lane for customer navigation, at least one order station located along the pathway for placing orders by customers in vehicles, the first building having a delivery window for delivering orders to a customer in a vehicle, the delivery window located adjacent to the pathway, and the organic food grocery store supplying the organic foods restaurant with organics food preparations for sale. Additional details may preferably include: a display positioned adjacent the order station, the display for displaying information relating to a specific customer's order and for confirming the customer's order; the at least one order station displays a GUI from which to select various menu options shown in a hierarchical structure displaying relationships between menu categories, menu items, and menu modifiers; the at least one order station is a touchscreen; preparing organic food at the organic food retail store includes cooking the organic food order; supplying the organic foods restaurant with organics food preparations for sale does not include cooking the organic food order; the first building comprises a pick up-only entrance; customers who utilize order from an internet application may pick up said orders at said pick up-only entrance; and the at least one order station comprises nutritional and price information.

Another preferred embodiment of the present invention contemplates a method of servicing customers in vehicles in an organic vehicular drive-through to deliver ready orders to customers having the steps of providing an organic food retail store, providing a drive through restaurant adjacent said organic food retail store, communicating and receiving electronic communications between the organic food retail store and the drive through restaurant, receiving orders from a customer, preparing ready orders based on the orders from the customer, checking out the customer, and delivering ready orders to the customer. Additional steps and details may preferably include: displaying information specific to an order at a location that can be viewed by a customer waiting in a vehicle waiting area; receiving orders from a customer comprises receiving orders from an internet application; providing the customer's organic food order to the customer is done at a pick up-only entrance; receiving orders from a customer comprises receiving orders from a menu located adjacent the drive through restaurant; providing the customer's organic food order to the customer is done a drive through pickup window; the menu comprises a touch screen;

Such embodiments do not represent the full scope of the invention. Reference is made therefore to the claims herein for interpreting the full scope of the invention. Other objects of the present invention, as well as particular features, elements, and advantages thereof, will be elucidated or become apparent from, the following description and the accompanying drawing figures.

BRIEF DESCRIPTION OF THE DRAWINGS

Other features of my invention will become more evident from a consideration of the following brief descriptions of drawings.

DETAILED DESCRIPTION OF THE PREFERRED EMBODIMENT

Referring now the drawings with more specificity, the present invention essentially provides an organic foods or non-GMO foods drive through, and/or methods and systems for supplying a standalone fast food restraint from a big box retail store and associated applications for use with smart phones and other electronic devices. Using the present invention a user may be able to order food from a menu at a drive through or use associated applications to order take out that is equivalent to food provided at an organic food grocery store. In addition the system can be able to account for and work with with several other variables and features discussed below.

Figure 1:
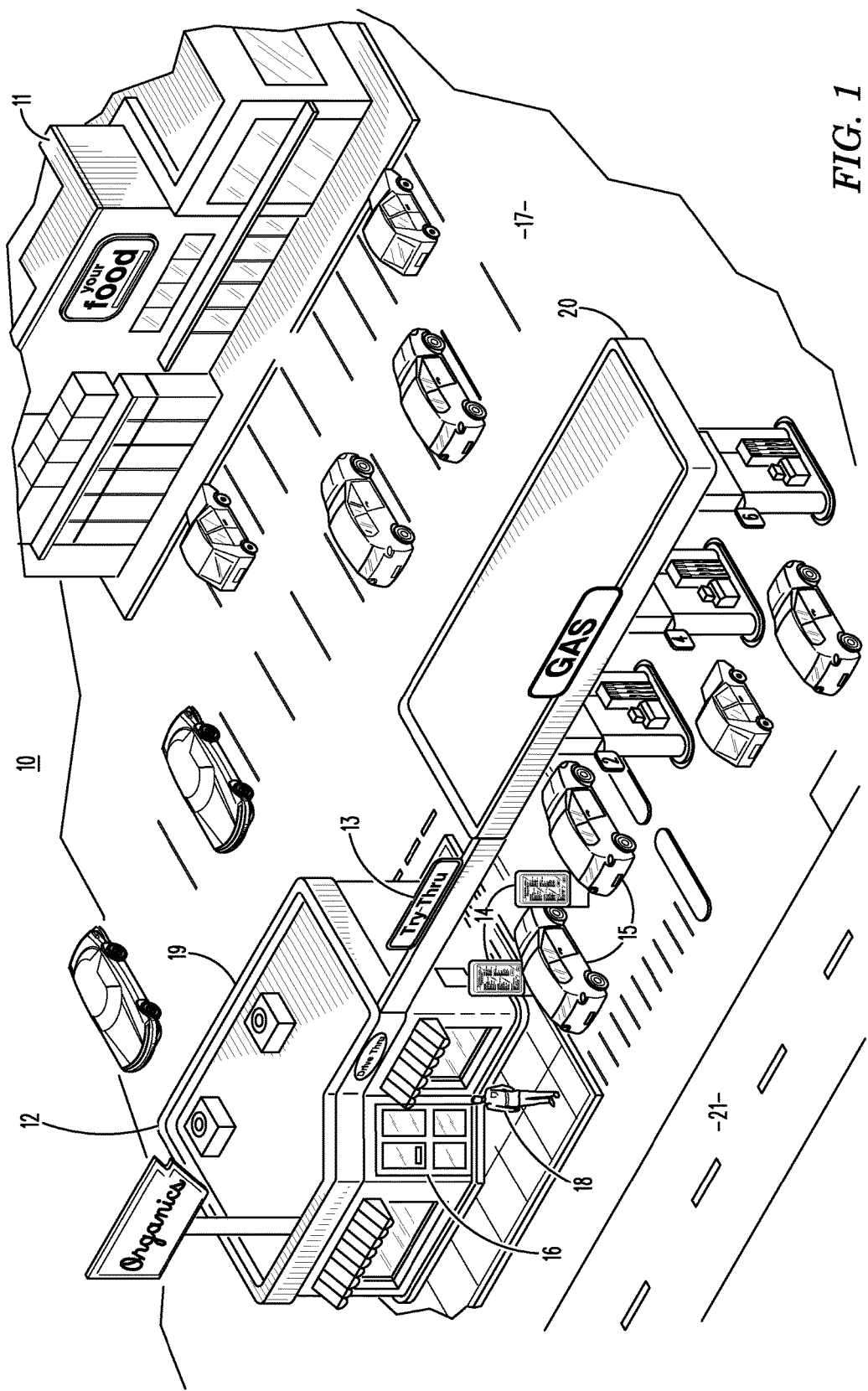
FIG. 1 is a perspective view of a representative drive through and food store parking lot.

Looking now to FIG. 1 a representative organic food system 10 is shown. As shown, organic food store 11, organic food drive through 12, and gas station 20 are situated on parking lot 17 adjacent to road 21. In certain embodiments banner or eve 13 may be situated such that customers 15 may easily pass under them and said eves 13 may provide advertising space or alternatively shading for customers from sun, rain, and the elements. Preferably customers 15 can order at a menu 14 (which is shown in greater exemplary detail in FIG. 2). Then customers can proceed to pick up window 19 (partially obscured) to pick up their order as in a traditional drive through.

An alternative ordering and pick up system is also partially depicted in FIG. 1. Customer 18 may selectively order using a smart phone or internet application (as partially shown in FIG. 2) and enter into the fast organic food restaurant 12 by pick up entrance 16.

This may also allow for the simultaneous pick up of groceries from store 11 if the option for grocery and organic food pickup is combined. An aspect of the preferred embodiment of the applications of the invention are shown in FIG. 2.

Figure 2:
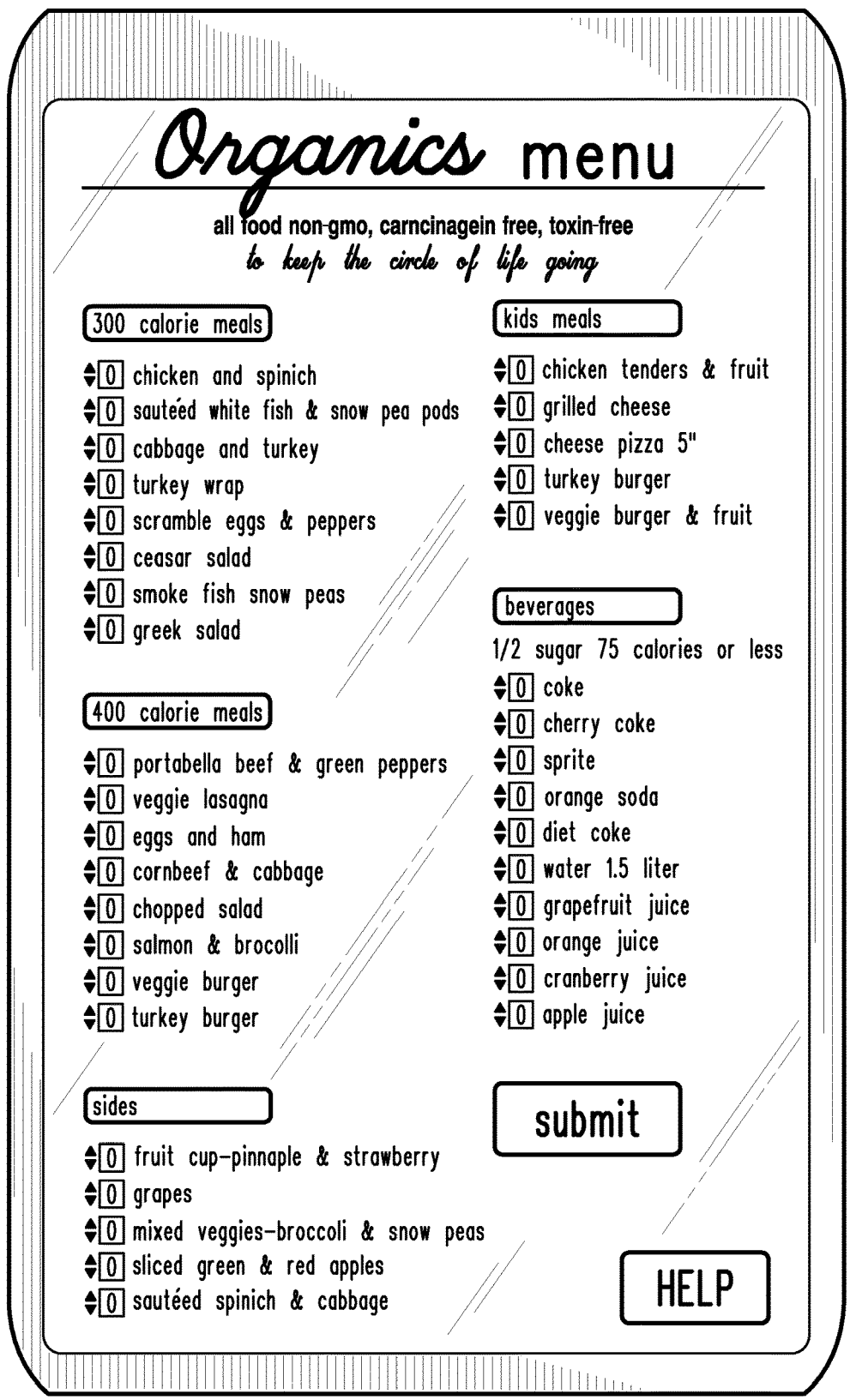
FIG. 2 is a a representative organics foods menu for use with the drive through and associated applications.

FIG. 2 shows an example of a portion of the GUI provided by the operating system of a preferred embodiment of the present invention. The preferred embodiment includes an intuitive GUI I from which to select various menu options for ordering and checkout. The menu 14 outside the restaurant 12 will, in some embodiments be a touchscreen. Typically the ordering menu 14 will be mirrored within the application. In some embodiments, as shown a hierarchical structure is used to show the different relationships between the menu categories (e.g., 300 Calories, kids meals, 400 calorie meals, beverages, sides), menu items 4 (e.g., chicken tenders, etc) and menu modifiers (e.g., dressing, condiments, etc.).

Just as the menu can be configured to be mirrored on the application, if can also be built to be mirrored onto a desktop website or similar application. Thus, the menu can easily be modified to be transmitted over 3 or more mediums for various applications and pick ups. In most applications, a communications control program monitors and routes all communications to the appropriate devices and to the ordering center to display the orders to employees at store 11 or drive through 12.

Figure 3:
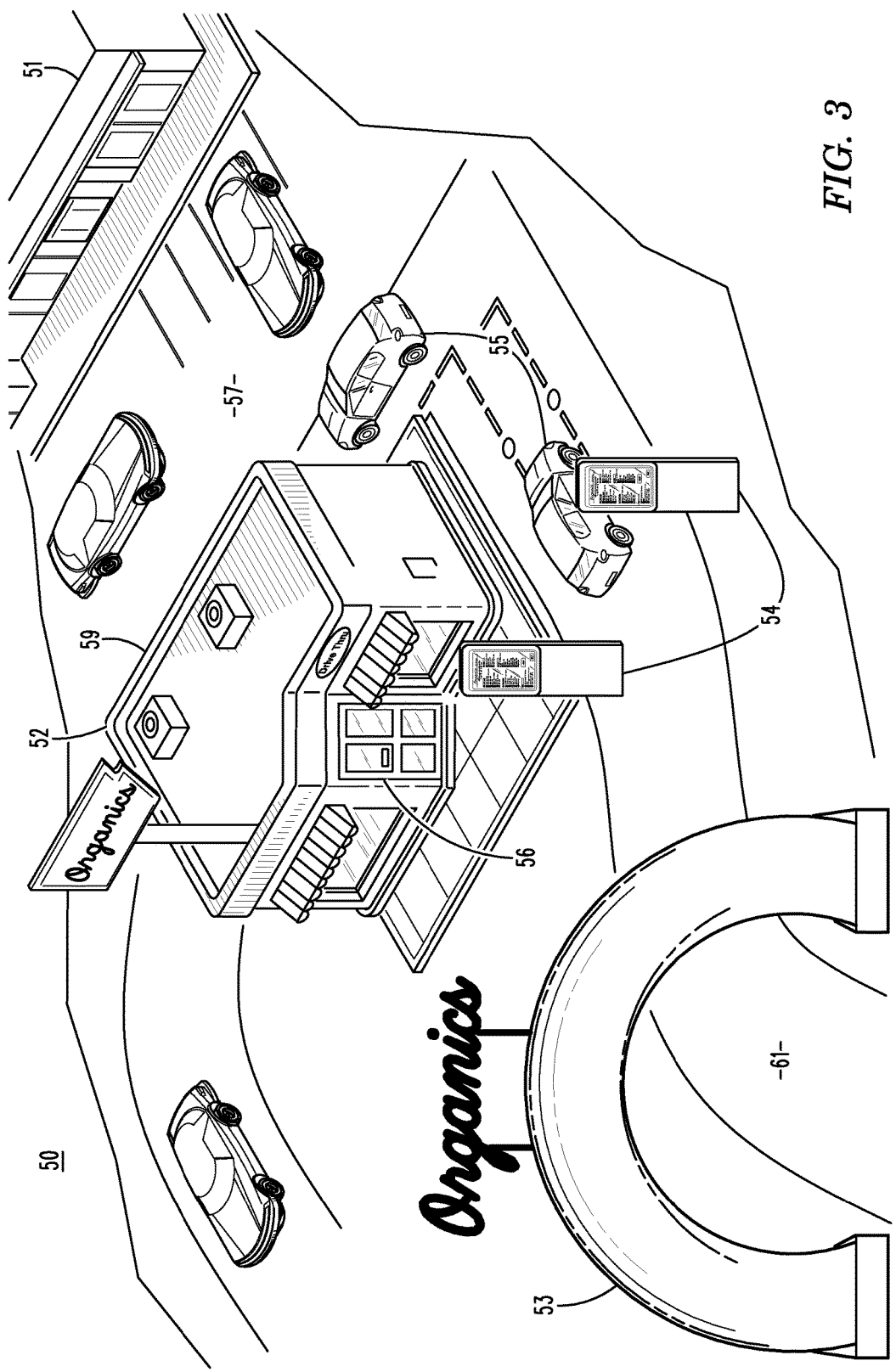
FIG. 3 is a perspective view of a second embodiment of the drive through and food store parking lot contemplated by this invention.

Looking now to FIG. 3 a second representative organic food system 50 is shown. As shown, organic food store 51 and organic food drive through 52 are situated on parking lot 57 adjacent to road 1. In certain embodiments entrance arch 53 may be situated such that customers 55 may easily pass under them and said arch may provide advertising space or other similar functions. Preferably customers 55 can order at a menu 54 (which is shown in greater exemplary detail in FIG. 2). Then customers can proceed to pick up window 59 (partially obscured) to pick up their order as in a traditional drive through. An alternative ordering and pick up system is also partially depicted in FIG. 3. Customers may selectively order using a smart phone or internet application (as partially shown in FIG. 2) and enter into the fast organic food restaurant 52 by pick up entrance 56. This may also allow for the simultaneous pick up of groceries from store 51 if the option for grocery and organic food pickup is combined.

Figure 4:
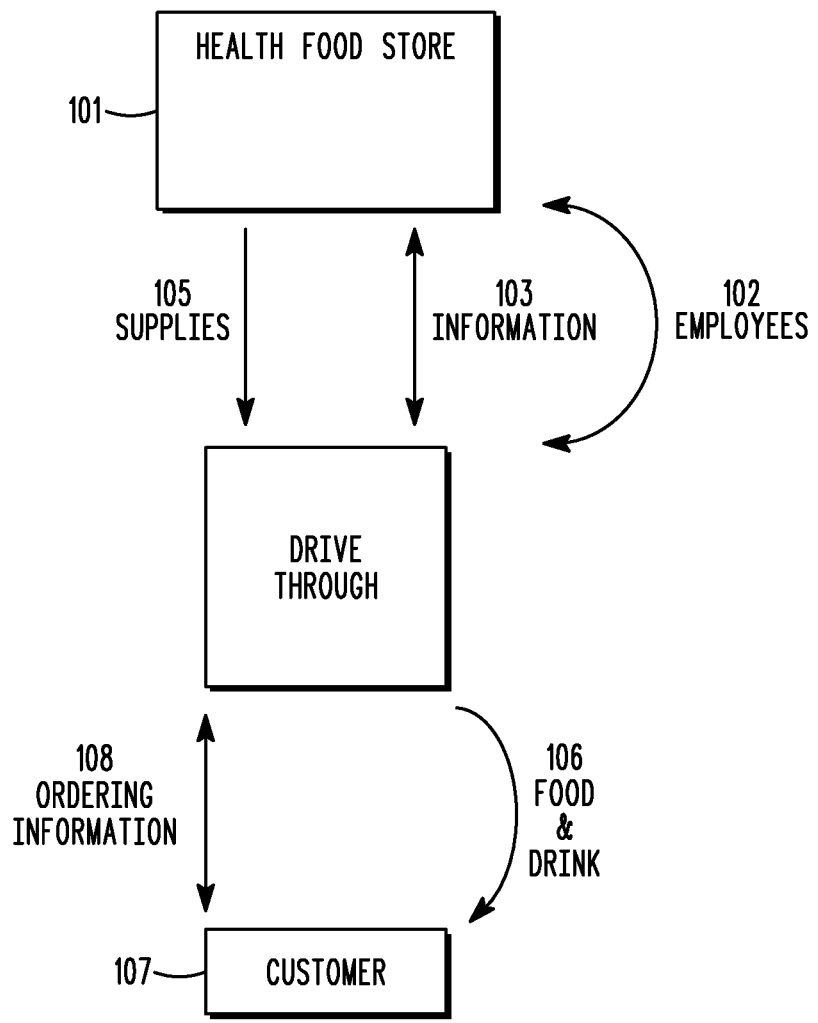
FIG. 4 is a representative flow chart describing the methods of ordering and resupplying an organic foods drive through according to the present invention.

Looking now with greater specificity to FIG. 4 exemplary actions, methods, and transactions the operation of the proposed organics food drive through of the current invention are depicted. As shown in FIG. 4, health food store 101 and drive through (thru) 104 share employees 102 and information 103. This is used to minimize employment costs and aid in re-supply 105 of the drive through 104. Customers 107 then can utilize the drive through passing ordering information 108 and eventually the drive through 104 provides the consumer 107 with food and drink 106 as ordered. Parameters and features of these transactions are discussed in greater detail throughout the specification but may include material costs, employee wages, and throughput, etc.

Accordingly, although the invention has been described by reference to certain preferred and alternative embodiments, it is not intended that the novel arrangements be limited thereby, but that modifications thereof are intended to be included as falling within the broad scope and spirit of the foregoing disclosures and the appended drawings.

I claim:

1. A method for providing and selling organic food comprising:
   providing an organic food retail store;
   providing a drive through restaurant adjacent said organic food retail store said restaurant being in association with and being supplied and resupplied by said retail store in real time;
   receiving orders from a customer;
   assembling a customer's organic food order based on the orders from the customer;
   checking out the customer; and
   providing the customer's organic food order to the customer.

2. The method of claim 1 further comprising:
   preparing organic food at the organic food retail store;
   transporting said organic food to the drive through restaurant at the start of each day; and
   utilizing said organic food when assembling the customer's food order.

3. The method of claim 2 wherein:
   preparing organic food at the organic food retail store includes cooking the organic food order at the start of each day.

4. The method of claim 2 wherein:
   preparing organic food at the organic food retail store does not include cooking the organic food order; and
   utilizing said organic food when assembly the customer's food order at the drive through restaurant includes cooking said organic food in real time.

5. The method of claim 1 wherein:
   receiving orders from a customer comprises receiving orders from an internet application or through the drive through itself via touch screen or via person; and
   providing the customer's organic food order to the customer is done at a pick up-only entrance.

6. The method of claim 1 wherein:
   receiving orders from a customer comprises receiving orders from a menu located adjacent the drive through restaurant; and
   providing the customer's organic food order to the customer is done a drive through pickup window.

7. A drive through organic food restaurant system for providing both vehicular drive-thru and non-drive-thru customer food ordering comprising:
   a parking lot;
   a first building situated on the lot, being an organic foods restaurant for preparing drive-thru and non-drive-thru customer orders and for delivering of the customer orders to the customers;
   a second building situated on the lot, being an organic foods grocery store;
   the first and second building being in cooperation and sharing resources in real time;
   a vehicular pathway for customers, the pathway including at least one lane for customer navigation;
   at least one order station located along the pathway for placing orders by customers in vehicles;

the first building having a delivery window for delivering orders to a customer in a vehicle, the delivery window located adjacent to the pathway; and the organic food grocery store supplying the organic foods restaurant with organics food preparations for sale.

8. The system of claim 7 further comprising:

a display positioned adjacent the order station, the display for displaying information relating to a specific customer's order and for confirming the customer's order.

9. The system of claim 7 wherein:

the at least one order station displays a GUI from which to select various menu options shown in a hierarchical structure displaying relationships between menu categories, menu items, and menu modifiers.

10. The system of claim 9 wherein:

the at least one order station is a touchscreen;

preparing organic food at the organic food retail store includes cooking the organic food order at the start of each day.

11. The system of claim 7 wherein:

supplying the organic foods restaurant with organics food preparations for sale in real time does not include cooking the organic food order.

12. The system of claim 7 wherein:

the first building comprises a pick up-only entrance;

customers who utilize order from an internet application may pick up said orders at said pick up-only entrance.

13. The system of claim 7 wherein:

the at least one order station comprises nutritional and price information.

14. A method of servicing customers in vehicles in an organic vehicular drive-through to deliver ready orders to customers comprising, providing an organic food retail store;

providing a drive through restaurant adjacent said organic food retail store;

communicating and receiving electronic communications between the organic food retail store and the drive through restaurant;

moving supplies between the organic food retail store and the drive through restaurant at the start of each day;

receiving orders from a customer;

preparing ready orders in real time based on the orders from the customer;

checking out the customer; and delivering ready orders to the customer.

15. The method of claim 14 further comprising:

displaying information specific to an order at a location that can be viewed by a customer waiting in a vehicle waiting area.

16. The method of claim 14 wherein:

receiving orders from a customer comprises receiving orders from an internet application a touch screen menu; or via a person in the drive thru; and providing the customer's organic food order to the customer is done at a pick up-only entrance.

17. The method of claim 16 further comprising:

combining groceries at the start of each day and in real time from the organic food retail store and the drive through restaurant and presenting both at the pickup simultaneously.

18. The method of claim 14 wherein:

receiving orders from a customer comprises receiving orders from a menu located adjacent the drive through restaurant; and providing the customer's organic food order to the customer is done a drive through pickup window.

19. The method of claim 18 wherein:

the menu comprises a touch screen.

* * * * *